United States Patent [19]

Blunier

[11] 4,049,085
[45] Sept. 20, 1977

[54] CALIPER BRAKE WITH ASSEMBLY FOR ROTOR ATTACHMENT TO HUB

[75] Inventor: Donald E. Blunier, Niles, Mich.

[73] Assignee: Safety Racing Equipment, Incorporated, Eau Claire, Mich.

[21] Appl. No.: 713,110

[22] Filed: Aug. 10, 1976

[51] Int. Cl.² .............................................. F16D 65/12
[52] U.S. Cl. .......................... 188/18 A; 188/218 XL; 301/9 DN
[58] Field of Search ...................... 188/18 A, 18 R, 17, 188/218 XL, 71.1, 73.2, 264 A, 264 AA; 301/9 DN, 6 WB, 6 R, 6 E; 180/75; 280/96.1; 192/107 R

[56] References Cited

U.S. PATENT DOCUMENTS

| 3,403,760 | 10/1968 | Caskey | 188/218 XL |
| 3,486,218 | 12/1969 | Buyze | 188/218 XL X |
| 3,749,416 | 7/1973 | Asberg | 188/18 A X |
| 3,780,834 | 12/1973 | Lottridge | 188/18 A |

Primary Examiner—Trygve M. Blix
Assistant Examiner—Douglas C. Butler
Attorney, Agent, or Firm—Gordon W. Hueschen

[57] ABSTRACT

A rotor for a caliper brake and rotor therefor is provided with apposed chamfers adapted to seat over a flange on a wheel hub and the rotor is attached to the flange with the flange seated in one or the other of the chamfers. Thus, when the rotor is attached in one position, it is closer to the hub than when it is attached in the other position. A single rotor therefore is adapted to fit a plurality of different caliper brakes.

6 Claims, 5 Drawing Figures

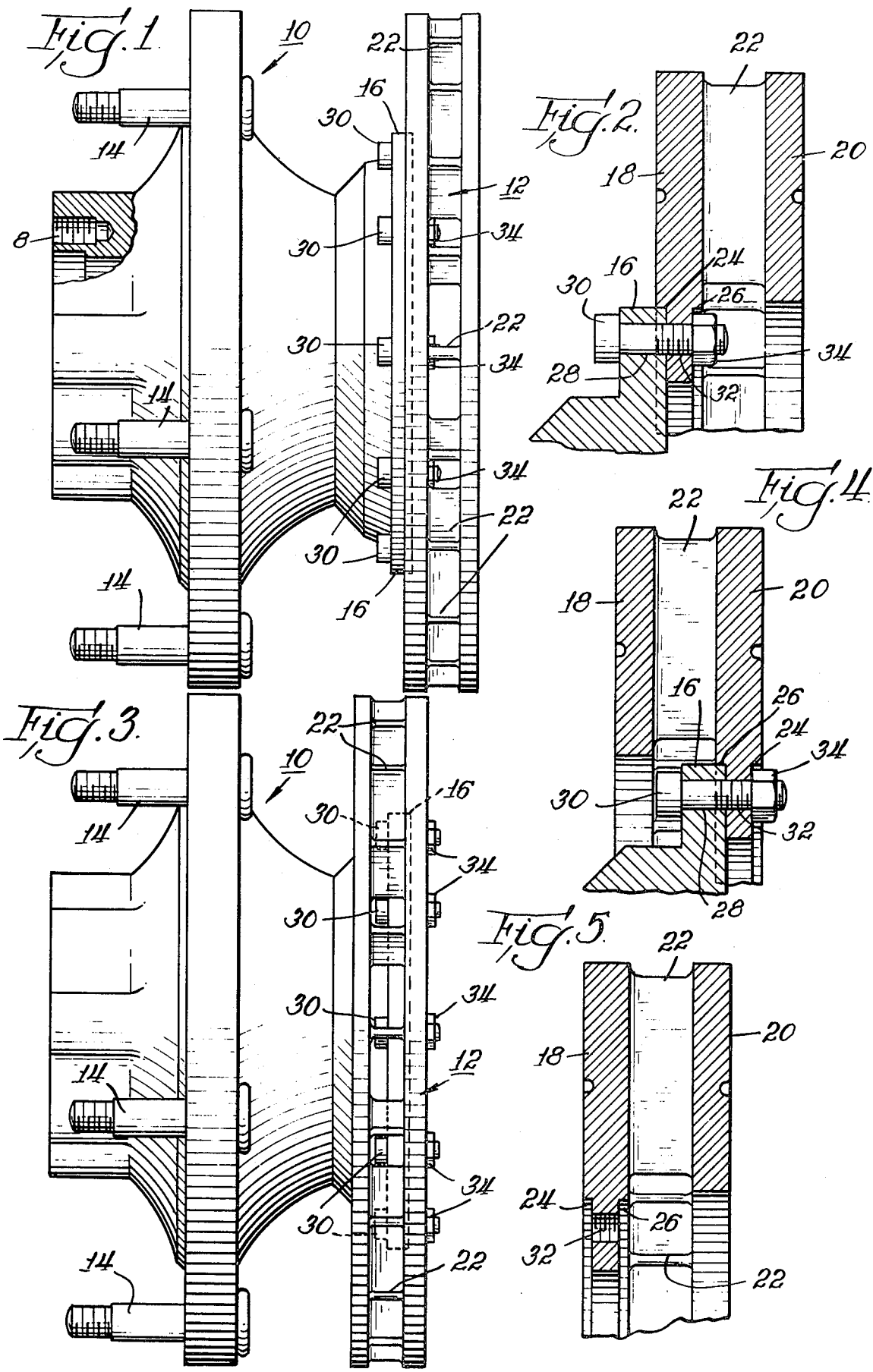

CALIPER BRAKE WITH ASSEMBLY FOR ROTOR ATTACHMENT TO HUB

BACKGROUND OF THE INVENTION

Field of Invention and Prior Art

This invention relates to caliper brakes and is particularly directed to rotors therefor which are adapted as replacement parts for different types of caliper brakes.

Caliper or disc brakes are in common usage in the industry, especially in sport cars and racing cars, and special equipment is available for customizing cars equipped with disc or caliper brakes. Rotors for such brakes commonly comprise two parallel annular wear faces connected by fan blades, so that, on rotation, air is induced to flow between the wear faces. Means is provided for attaching such rotors to the hub of the vehicle. Such devices are illustrated, for example, in U.S. PATS. No. 2,908,358, 3,403,760, 3,749,416, and 3,780,834.

OBJECTS OF THE INVENTION

It is object of the invention to provide a new and useful caliper brake. It is a further object of the invention to provide a new and improved rotor for a caliper brake. It is a further object of the invention to provide a replacement rotor which is adapted for use in a wide variety of caliper brakes. It is a further object of the invention to avoid the disadvantages of the prior art and to obtain such advantages as will appear as the description proceeds.

BRIEF DESCRIPTION OF THE INVENTION

The invention relates to a caliper brake having a hub, a rotor, and calipers, in which the hub has an annular rotor attaching flange and the rotor has apposed annular chamfers complementary to the annular flange and means for attaching the rotor to the flange with the flange seated in one or the other of the chamfers. The chamfers are located to one side of the center plane of the rotor, so that, in one position, the rotor is closer to the hub than in the other, thus making it possible to utilize the rotor of the invention in different caliper brakes in which the calipers are located in different positions relative to the hub.

It is sometimes desirable in customizing the brakes of a vehicle to replace the hub, especially where the hub on the vehicle does not already have the necessary annular flange in the proper location.

Advantageously, the rotor is made of two parallel annular wear faces, the first of which has a smaller inside diameter than the second and both of which have the same outside diameter, and in which the chamfers are on apposed faces of the first named wear face and have a diameter less than the inside diameter of the second annular wear face. Thus, the second annular wear face can pass over the annular flange of the hub readily when it is desired to mount the rotor with the annular flange thereof seated in the innermost chamfer.

Advantageously, the annular wear faces are connected by fan blades so that on rotation air is induced to flow between the two wear faces.

BRIEF DESCRIPTION OF THE DRAWINGS

In The Drawings

FIG. 1 is a side elevation of a wheel hub with the rotor mounted thereon in one position.

FIG. 2 is a detailed view in section of FIG. 1

FIG. 3 is a side elevation with the rotor mounted in another position.

FIG. 4 is a detailed view in section of FIG. 3.

FIG. 5 is a detailed view in section of the rotor.

DETAILED DESCRIPTION OF THE INVENTION

In FIGS. 1 and 2 there is shown a hub 10 with a rotor 12 mounted thereon. The hub is journaled for mounting on the axle of a motor vehicle and has lugs 14 or holes for receiving such lugs for mounting a wheel on the hub. The outer edge of the hub has peripheral holes 8 threaded therein for mounting a hub cap.

At the opposite side of the hub is an annular flange 16 and mounted on the annular flange 16 is the rotor 12. The rotor 12 comprises a first annular wear face 18 and a second annular wear face 20. Both wear faces have the same outside diameter but the first wear face 18 has a smaller inside diameter than the second wear face 20. The two wear faces 18 and 20 are connected by fan blades 22 which function as the rotator rotates to induce a flow of air through and between the parallel wear faces.

The first annular wear face has, at the inner periphery thereof, two apposed annular chamfers 24 and 26. These annular chamfers are complementary with the annular flange 16, so that, when the rotor is mounted on the hub, the flange seats in the chamfer 24 or 26 on flange 16 according to whether the rotor is mounted in the position shown in FIG. 2 or in the position shown in FIG. 4.

The chamfers 24 and 26 are concentric, have the same diameter and a diameter less than the inside diameter of the second annular wear face 20. This, as shown particularly in FIG. 4, permits the annular flange 16 freely to pass into the rotor for mounting in the annular chamfer 26.

The annular flange 16 is provided with a plurality of peripheral holes 28 for receiving bolts 30 and the annular chamfers 24-26 have complementary peripheral holes 32 therein also for receiving bolts 30.

The bolts are secured in place with nuts 34. If desired, an annular ring having threaded holes complementary with the holes 32 can be inserted in the unused chamfer and the bolts screwed thereinto. Alternatively, the holes 32 can be threaded and the bolts 30 screwed thereinto.

The hub and rotor may be constructed of any suitable material but, advantageously, the hub is made of magnesium alloy in order to get maximum heat dissipation from the rotor. The rotor may be made of any wear resistant steel or alloy, for example, manganese steel.

The form and design of the hub is not a critical feature of the invention except for the annular flange 16 which cooperates to center and position the rotor 12 with reference to the calipers, not shown. It will thus be seen that there is provided a simple and effective rotor hub assembly for caliper brakes in which the rotor can be simply and easily mounted in one of two positions according to the demands of the particular caliper system of the caliper brake involved. The rotor of the invention, therefore, is of simple construction and of versatile application, making it possible to service and customize vehicles with caliper brakes with a minimum of stocking of replacement rotors.

It is to be understood that the invention is not to be limited to the exact details of operation or structure shown and described, as obvious modifications and equivalents will be apparent to one skilled in the art.

I claim:

1. In a caliper brake comprising a hub and a rotor, the combination of a hub having an annular rotor-attaching flange and a rotor having apposed annular chamfers complementary to said annular flange and means for attaching said rotor to said flange with the said flange in one of said chamfers, said chamfers being off center so that when the rotor seated in one chamfer it is closer to the hub than when it is seated in the other chamfer.

2. The caliper brake of claim 1, in which the rotor comprises two parallel annular wear faces, the first of which has a smaller inside diameter than the second and both of which have the same outside diameter and in which the chamfers are on apposed outside and inside faces of said first named annular wear face and have a diameter less than that of the inside diameter of the second annular wear face, whereby the second annular wear face can pass over the annular flange of the hub in seating the flange on the chamfer on said inside face.

3. The caliper brake of claim 2, in which said annular flange comprises a flat face normal to the axis of said hub and a rim surrounding said flat face normal thereto and in which said annular chamfers comprise apposed inset faces normal to the axis of said rotor and a shoulder surrounding each said inset face and normal thereto, said shoulders being complementary to said flat face, whereby when the flat face of said hub is seated against an inset face, the shoulder surrounding that inset face is seated on the rim of said flange.

4. The caliper brake of claim 1, in which said annular flange comprises a flat face normal to the axis of said hub and a rim surrounding said flat face normal thereto and in which said annular chamfers comprise apposed inset faces normal to the axis of said rotor and a shoulder surrounding each said inset face and normal thereto, said shoulders being complementary to said rim and said inset faces being complementary to said flat face, whereby when the flat face of said hub is seated against an inset face, the shoulder surrounding that inset face is seated on the rim of said flange.

5. A rotor for a caliper brake which comprises a first annular wear face and a second annular wear face, said annular wear faces having the same outside diameter but the first one having a smaller inside diameter than the second and apposed annular chamfers in said first annular wear face, having means therein whereby said rotor can be attached to a hub with the hub seated in one of said chamfers, said chamfers having a diameter less than that of the inside diameter of the second annular wear face, whereby the second annular wear face can pass over the hub to which the first annular wear face is attached.

6. The rotor of claim 5, in which said chamfers comprise apposed inset flat faces normal to the axis of said rotor and a shoulder surrounding each said inset flat face and normal thereto.

* * * * *